(12) United States Patent
Lyell (10) Patent No.: US 12,048,395 B2
(45) Date of Patent: Jul. 30, 2024

(54) TWIST OFF CONTAINER AND COUPLING ASSEMBLY FOR A MICRO PUREE MACHINE

(71) Applicant: SharkNinja Operating LLC, Needham, MA (US)

(72) Inventor: Nathan Lyell, Surrey (GB)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 18/089,700

(22) Filed: Dec. 28, 2022

(65) Prior Publication Data

US 2024/0215764 A1 Jul. 4, 2024

(51) Int. Cl.
A47J 43/07 (2006.01)

(52) U.S. Cl.
CPC ................................. A47J 43/0705 (2013.01)

(58) Field of Classification Search
CPC .................................................. A47J 43/0705
See application file for complete search history.

(56) References Cited

U.S. PATENT DOCUMENTS

| | | |
|---|---|---|
| 2,815,194 A | 12/1957 | Seyfried |
| 2,829,872 A | 4/1958 | MacDougall |
| D183,532 S | 9/1958 | Raymond |
| 3,630,493 A | 12/1971 | Carpigiani |
| D258,340 S | 2/1981 | Fuchs |
| 4,693,611 A | 9/1987 | Verkler |
| 4,705,055 A | 11/1987 | Rohm et al. |
| 4,828,398 A | 5/1989 | Verkler |
| 5,215,222 A | 6/1993 | McGill |
| 5,415,534 A | 5/1995 | Bertrand et al. |
| 5,803,377 A | 9/1998 | Farrell |
| 6,041,961 A | 3/2000 | Farrell |
| 6,250,794 B1 | 6/2001 | Huang |
| 6,824,303 B2 | 11/2004 | Huang |
| 7,028,607 B2 | 4/2006 | Zweben |

(Continued)

FOREIGN PATENT DOCUMENTS

| | | |
|---|---|---|
| CN | 201345883 | 11/2009 |
| CN | 102805194 | 2/2012 |

(Continued)

OTHER PUBLICATIONS

International Search Report and Written Opinion in Application No. PCT/CN2022/123017 dated Mar. 23, 2023, 12 pages.

(Continued)

*Primary Examiner* — Marc C Howell
(74) *Attorney, Agent, or Firm* — The Webb Law Firm (57) ABSTRACT

A twist off container and coupling assembly of a micro puree machine includes a container and a coupling on the micro puree machine. An interior surface of the coupling has at least one ramped slot that is angled relative to a lower annular surface of the coupling. The container has at least one protrusion correspondingly angled relative to an upper annular surface of the container. The protrusion is configured to engage the slot when the container is rotated in a clockwise direction and to disengage from the slot when the container is rotated in a counter-clockwise direction. When the container is rotated, the container moves both axially and rotationally relative to the coupling.

10 Claims, 11 Drawing Sheets

(56) References Cited

U.S. PATENT DOCUMENTS

| | | |
|---|---|---|
| 7,264,160 B2 | 9/2007 | Polarine et al. |
| 7,451,613 B2 | 11/2008 | Barraclough et al. |
| 7,993,053 B2 | 8/2011 | McGill |
| 8,109,714 B2 | 2/2012 | Keener |
| D655,133 S | 3/2012 | Brinckerhoff et al. |
| D681,385 S | 5/2013 | Ring et al. |
| D704,492 S | 5/2014 | Broen et al. |
| D732,330 S | 6/2015 | Cha et al. |
| D751,344 S | 3/2016 | Charlton |
| D751,849 S | 3/2016 | Dunham et al. |
| 9,351,504 B2 | 5/2016 | Ricco et al. |
| 9,565,868 B2 | 2/2017 | D'Agostino |
| D807,691 S | 1/2018 | Connell et al. |
| 9,968,222 B2 | 5/2018 | Audette |
| 9,993,015 B2 | 6/2018 | Geng et al. |
| 10,159,262 B2 | 12/2018 | Dong et al. |
| 10,299,628 B2 | 5/2019 | Gardner et al. |
| 10,595,544 B2 | 3/2020 | Beth Halachmi |
| 10,660,348 B2 | 5/2020 | Cheung |
| 10,786,119 B2 | 9/2020 | Cheung et al. |
| 10,794,624 B2 | 10/2020 | Rupp |
| 10,801,769 B2 | 10/2020 | Rupp |
| D914,453 S | 3/2021 | Kettavong et al. |
| 10,995,976 B2 | 5/2021 | Rupp |
| 11,002,473 B2 | 5/2021 | Rupp |
| 11,083,320 B2 | 8/2021 | Zhao et al. |
| 11,154,075 B2 | 10/2021 | Ricco et al. |
| 11,154,163 B1 | 10/2021 | He et al. |
| 11,279,609 B2 | 3/2022 | Fonte et al. |
| 11,291,335 B2 | 4/2022 | Liu et al. |
| 11,324,358 B1 | 5/2022 | O'Loughlin et al. |
| 11,337,439 B2 | 5/2022 | Fonte et al. |
| 11,439,158 B2 | 9/2022 | Farina |
| 11,470,855 B2 | 10/2022 | Fonte et al. |
| D979,321 S | 2/2023 | Coakley |
| 11,583,144 B1 | 2/2023 | Williams et al. |
| D985,331 S | 5/2023 | He et al. |
| D985,334 S | 5/2023 | Proulx et al. |
| 11,759,057 B1 | 9/2023 | Chu et al. |
| 11,819,814 B1 | 11/2023 | Lyell |
| 11,844,454 B1 | 12/2023 | Lyell et al. |
| 2003/0000240 A1 | 1/2003 | Pahl |
| 2003/0066916 A1 | 4/2003 | Pavlovic et al. |
| 2004/0081733 A1 | 4/2004 | Buter et al. |
| 2004/0161503 A1 | 8/2004 | Malone et al. |
| 2005/0047272 A1 | 3/2005 | Sands |
| 2005/0170054 A1 | 8/2005 | Czark et al. |
| 2005/0172826 A1 | 8/2005 | Kim |
| 2005/0173462 A1 | 8/2005 | Stumler et al. |
| 2006/0255066 A1 | 11/2006 | Kannar et al. |
| 2007/0056447 A1 | 3/2007 | Swartz et al. |
| 2007/0241140 A1 | 10/2007 | Cocchi |
| 2008/0117714 A1 | 5/2008 | Pavlovic et al. |
| 2011/0090756 A1 | 4/2011 | Farrell et al. |
| 2011/0242931 A1 | 10/2011 | Farrell |
| 2012/0027902 A1* | 2/2012 | Audette .............. A47J 43/046 366/205 |
| 2012/0048977 A1* | 3/2012 | Machovina ........... A47J 43/046 241/277 |
| 2012/0096876 A1 | 4/2012 | Ravji et al. |
| 2013/0344220 A1 | 12/2013 | Farrell et al. |
| 2014/0130538 A1 | 5/2014 | Bond et al. |
| 2014/0203127 A1 | 7/2014 | Merl |
| 2014/0312152 A1 | 10/2014 | Pai |
| 2015/0201808 A1 | 7/2015 | Katsuki et al. |
| 2015/0216360 A1 | 8/2015 | Hosner |
| 2015/0265102 A1 | 9/2015 | Kidd |
| 2015/0272394 A1 | 10/2015 | Lin et al. |
| 2017/0112326 A1 | 4/2017 | Ochoa et al. |
| 2019/0323754 A1* | 10/2019 | Rupp ..................... A23G 9/28 |
| 2020/0245639 A1 | 8/2020 | Crema et al. |
| 2020/0260755 A1 | 8/2020 | Harrison et al. |
| 2021/0055027 A1 | 2/2021 | Rupp |
| 2021/0068419 A1 | 3/2021 | Spirk et al. |
| 2021/0106508 A1* | 4/2021 | Akridge .............. B01F 27/91 |
| 2021/0120841 A1 | 4/2021 | Kiser et al. |
| 2021/0204564 A1 | 7/2021 | Bellomare et al. |
| 2021/0227848 A1 | 7/2021 | Yang et al. |
| 2021/0274974 A1 | 9/2021 | Abraham et al. |
| 2021/0371265 A1 | 12/2021 | Fonte et al. |
| 2022/0202247 A1 | 6/2022 | He et al. |
| 2022/0202248 A1 | 6/2022 | O'Loughlin et al. |
| 2022/0202249 A1 | 6/2022 | He et al. |
| 2022/0202254 A1 | 6/2022 | O'Loughlin |
| 2022/0225636 A1 | 7/2022 | Minard et al. |
| 2022/0225831 A1 | 7/2022 | He et al. |
| 2022/0408977 A1 | 12/2022 | Deng et al. |
| 2023/0010316 A1 | 1/2023 | White et al. |
| 2023/0301467 A1 | 9/2023 | Proulx et al. |

FOREIGN PATENT DOCUMENTS

| | | |
|---|---|---|
| CN | 103168908 | 6/2013 |
| CN | 103181715 | 7/2013 |
| CN | 203088680 | 7/2013 |
| CN | 203152409 | 8/2013 |
| CN | 203233980 | 10/2013 |
| CN | 204362865 | 6/2015 |
| CN | 110168296 | 8/2019 |
| CN | 210642278 | 6/2020 |
| CN | 112042801 | 12/2020 |
| CN | 112469283 | 3/2021 |
| CN | 112512393 | 3/2021 |
| CN | 105828630 | 5/2021 |
| CN | 216282190 | 4/2022 |
| EP | 0314209 | 5/1989 |
| EP | 0891139 | 1/1999 |
| EP | 0995685 | 4/2000 |
| EP | 0891139 | 5/2002 |
| EP | 1495682 | 1/2005 |
| EP | 1586259 A1 | 10/2005 |
| EP | 1689250 | 8/2006 |
| EP | 2380474 A2 | 10/2011 |
| EP | 3060069 | 8/2016 |
| EP | 3535532 | 9/2019 |
| EP | 3616528 | 3/2020 |
| EP | 3692873 A1 | 8/2020 |
| EP | 3755160 | 12/2020 |
| EP | 3801042 | 4/2021 |
| EP | 3944796 A1 | 2/2022 |
| ES | 1071424 | 2/2010 |
| FR | 2585588 A1 | 2/1987 |
| IT | 202000005641 A1 | 9/2021 |
| JP | H01-11029 | 3/1989 |
| WO | 2005048745 | 6/2005 |
| WO | 2005070271 | 8/2005 |
| WO | 2015061364 | 4/2015 |
| WO | 2018085442 | 5/2018 |
| WO | 2018085443 A1 | 5/2018 |
| WO | 2019117804 | 6/2019 |
| WO | 2019146834 | 8/2019 |
| WO | 2019200491 | 10/2019 |
| WO | 2019224859 | 11/2019 |
| WO | 2020227235 A1 | 11/2020 |
| WO | 2021186353 A2 | 9/2021 |
| WO | 2022020653 A1 | 1/2022 |

OTHER PUBLICATIONS

International Search Report and Written Opinion in Application No. PCT/US2022/053650 dated Jul. 3, 2023, 13 pages.

International Search Report and Written Opinion in Application No. PCT/CN2022/123016 dated Mar. 31, 2023, 11 pages.

International Search Report and Written Opinion in Application No. PCT/US2022/054363 dated Aug. 9, 2023, 15 pages.

Extended European Search Report in Application No. 23172096.2 dated Oct. 19, 2023, 8 pages.

Kidisle 3 in 1 Single Serve Coffee Maker. Date earliest reviewed on Amazon.com Apr. 19, 2023. https://www.amazon.com/KIDISLE- (56) References Cited

OTHER PUBLICATIONS

Removable-Reservoir-Self-cleaning-Function/dp/B0CB5PM PQX/ref (Year: 2023), 1 page.

\* cited by examiner

TWIST OFF CONTAINER AND COUPLING ASSEMBLY FOR A MICRO PUREE MACHINE

FIELD OF THE INVENTION

The present disclosure relates to a twist-off container and coupling assembly for a food processing device and, more particularly, to a twist-off container and coupling assembly for a micro puree machine for making frozen foods and drinks.

BACKGROUND

Home use machines that are intended to make ice creams, gelatos, frozen yogurts, sorbets and the like are known in the art. Typically, a user adds a series of non-frozen ingredients to a container. The ingredients are then churned by a paddle while a refrigeration mechanism simultaneously freezes the ingredients. These devices have known shortcomings including, but not limited to, the amount of time and effort required by the user to complete the ice cream making process. Machines of this nature are also impractical for preparing most non-dessert food products.

An alternative type of machine known to make a frozen food product is a micro-puree machine. Typically, machines of this nature spin and plunge a blade into a pre-frozen ingredient or combination of ingredients. While able to make frozen desserts like ice creams, gelatos, frozen yogurts, sorbets and the like, micro puree style machines can also prepare non-dessert types of foods such as non-dessert purees and mousses. In addition, consumers can prepare either an entire batch of ingredients or a pre-desired number of servings.

In some micro puree machines, a lid housing the blade couples to the container of ingredients. To install the container on the machine, the user rotates the container relative to a coupling on the machine, which in turn rotates the lid into the coupling. The blade then engages a power shaft of the machine to spin and plunge the blade into the ingredients. However, in some cases when blending frozen ingredients, the blade may become stuck to the power shaft due to a build-up of ice between the blade and the power shaft. When this occurs, the user must use a significant force to rotate the container in the opposite direction to uncouple it from the machine.

SUMMARY

The disclosure describes a twist off container and coupling assembly of a micro puree machine which allows for gentle disengagement of the container from the machine when ice has formed between the blade and the power shaft of the machine. The assembly includes a container and a coupling on the micro puree machine. An interior surface of the coupling has at least one ramped slot that is angled relative to a lower annular surface of the coupling. The container also has at least one protrusion correspondingly angled relative to an upper annular surface of the container. The protrusion is configured to engage the slot when the container is rotated in a clockwise direction and to disengage from the slot when the container is rotated in a counter-clockwise direction. When the container is rotated, the container moves both axially and rotationally relative to the coupling, allowing the blade to disengage from the power shaft with less force than if the container could only move rotationally relative to the coupling.

Embodiments of the twist off container and coupling assembly of this disclosure may include one or more of the following, in any suitable combination.

Embodiments of the twist off container and coupling assembly of a micro puree machine of this disclosure include a container having at least one protrusion on an outer surface of the container. A coupling on the micro puree machine has at least one ramped slot on an interior surface of the coupling. The at least one ramped slot is angled relative to a lower annular surface of the coupling. The at least one protrusion is configured to slidably engage the at least one ramped slot when the container is rotated in a first direction. The at least one protrusion is correspondingly angled relative to an upper annular surface of the container such that, when the container is rotated in the first direction, the container moves both axially and rotationally relative to the coupling.

In further embodiments, the at least one ramped slot and the at least one protrusion form a helical bayonet mount. In embodiments, the at least one protrusion is two protrusions, and the at least one ramped slot is two ramped slots. Each of the two protrusions are configured to slidably engage a respective one of each of the two ramped slots. In embodiments, the two protrusions are positioned on opposing sides of the outer surface of the container. In other embodiments, the at least one protrusion is four protrusions, and the at least one ramped slot is four ramped slots. Each of the four protrusions are configured to slidably engage a respective one of each of the four ramped slots. In embodiments, the four protrusions are equally spaced apart about the outer surface of the container. In embodiments, a container axis extending between a top and a bottom of the container is not vertically aligned with a vertical axis of the micro puree machine when the container is locked to the coupling. In embodiments, the container axis forms an angle of between 1 and 180 degrees with respect to the vertical axis of the micro puree machine. In other embodiments, the container axis forms an angle of between 45 and 55 degrees with respect to the vertical axis of the micro puree machine. In embodiments, the assembly further includes a lid coupled to the container. In embodiments, the lid is configured to house a blade of the micro puree machine.

Embodiments of a coupling of a micro puree machine of this disclosure include a coupling body having an inner surface. The coupling body also includes at least one ramped slot on the interior surface of the coupling. The at least one ramped slot is angled relative to a lower annular surface of the coupling body. The at least one ramped slot forms a part of a helical bayonet mount. In embodiments, the at least one ramped slot is two ramped slots positioned on opposite sides of the inner surface of the coupling. In other embodiments, the at least one ramped slot is four ramped slots equally spaced apart about the inner surface of the coupling.

A reading of the following detailed description and a review of the associated drawings will make apparent the advantages of these and other structures. Both the foregoing general description and the following detailed description serve as an explanation only and do not restrict aspects of the disclosure as claimed.

BRIEF DESCRIPTION OF THE DRAWINGS

Reference to the detailed description, combined with the following figures, will make the disclosure more fully understood, wherein.

DETAILED DESCRIPTION

In the following description, like components have the same reference numerals, regardless of different illustrated embodiments. To illustrate embodiments clearly and concisely, the drawings may not necessarily reflect appropriate scale and may have certain structures shown in somewhat schematic form. The disclosure may describe and/or illustrate structures in one embodiment, and in the same way or in a similar way in one or more other embodiments, and/or combined with or instead of the structures of the other embodiments.

In the specification and claims, for the purposes of describing and defining the invention, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts. Use of the terms "top," "bottom," "above," "below" and the like helps only in the clear description of the disclosure and does not limit the structure, positioning and/or operation of the twist off container and coupling in any manner.

Figure 1:
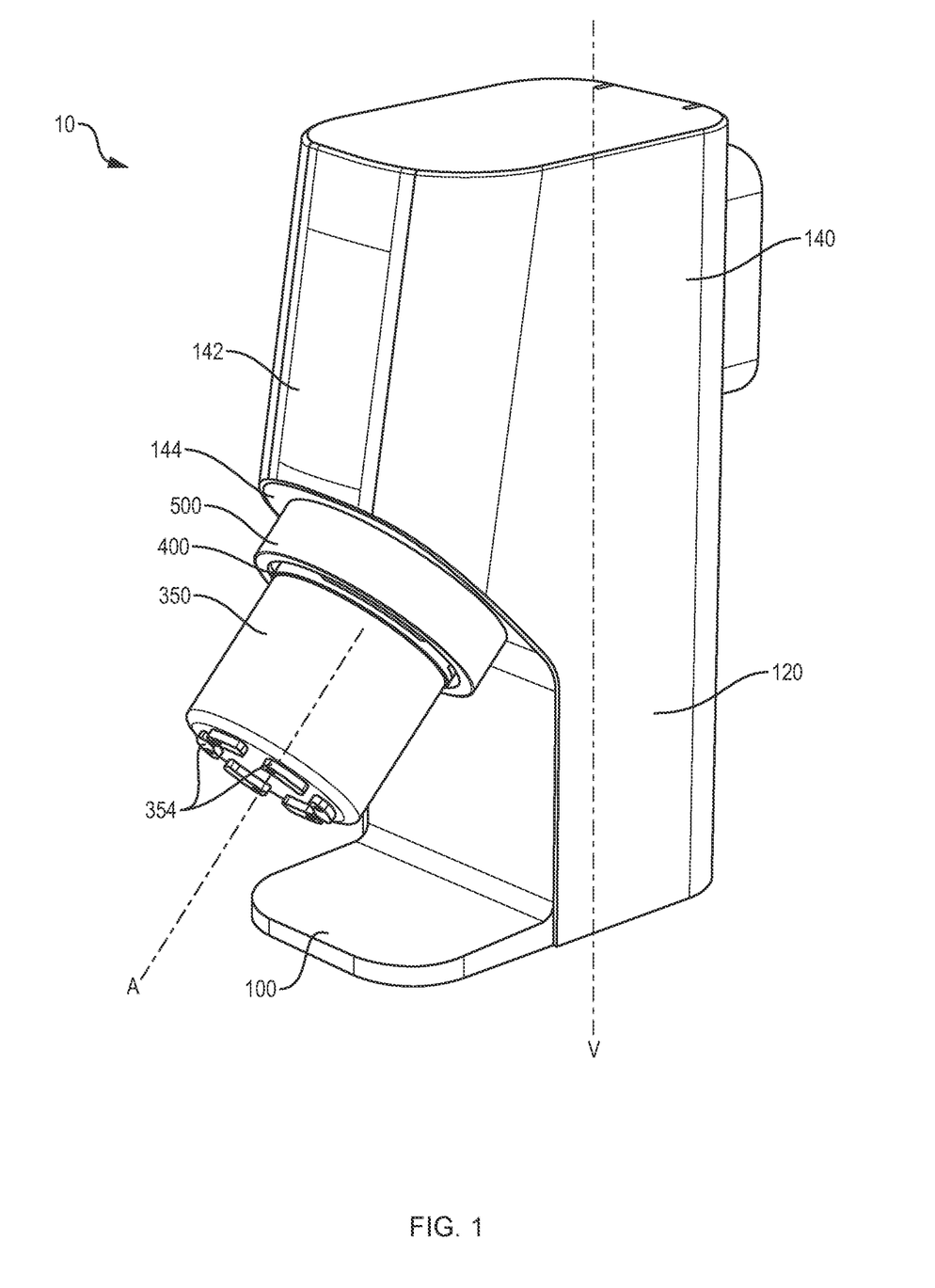
FIG. 1 shows a micro puree machine according to some embodiments of this disclosure.

FIG. 1 shows an isometric view of a micro puree machine 10 according to an illustrative embodiment of the present disclosure. The micro puree machine 10 may include a base 100 and an upper housing 140. A middle housing 120 may extend between the base 100 and the upper housing 140. The upper housing 140 may include an interface 142 for receiving user inputs to control the micro puree machine 10 and/or display information. The micro puree machine 10 may also include a removable container 350 and a lid 400. The container 350 may contain one or more pre-frozen ingredients for processing. A user may couple the container 350 to a coupling 500 on an angled surface 144 of the upper housing 140 by rotating the container 350 relative to the coupling 500, as further described below. When engaged with the coupling 500, the container 350 may not be aligned with a vertical axis V of the micro puree machine 10. Instead, a container axis A extending between a top and bottom of the container 350 may form an angle of between 1 degree and 180 degrees with respect to the vertical axis V. Preferably, the container axis A forms an angle of about 45 degrees to about 55 degrees relative to the vertical axis V. In embodiments, the container 350 may include features 354 on the bottom surface of the container 350 to aid in the fixing of frozen ingredients within the container 350. The features 354 may prevent such frozen ingredients from rotational movement within the container 350 during use. In embodiments, the container 350 can be manufactured from a disposable material to enhance the convenience of using the micro puree machine 10. Further, the container 350 can be sold as a stand-alone item and can also be prefilled with ingredients to be processed during use of the micro puree machine 10.

Figure 2:
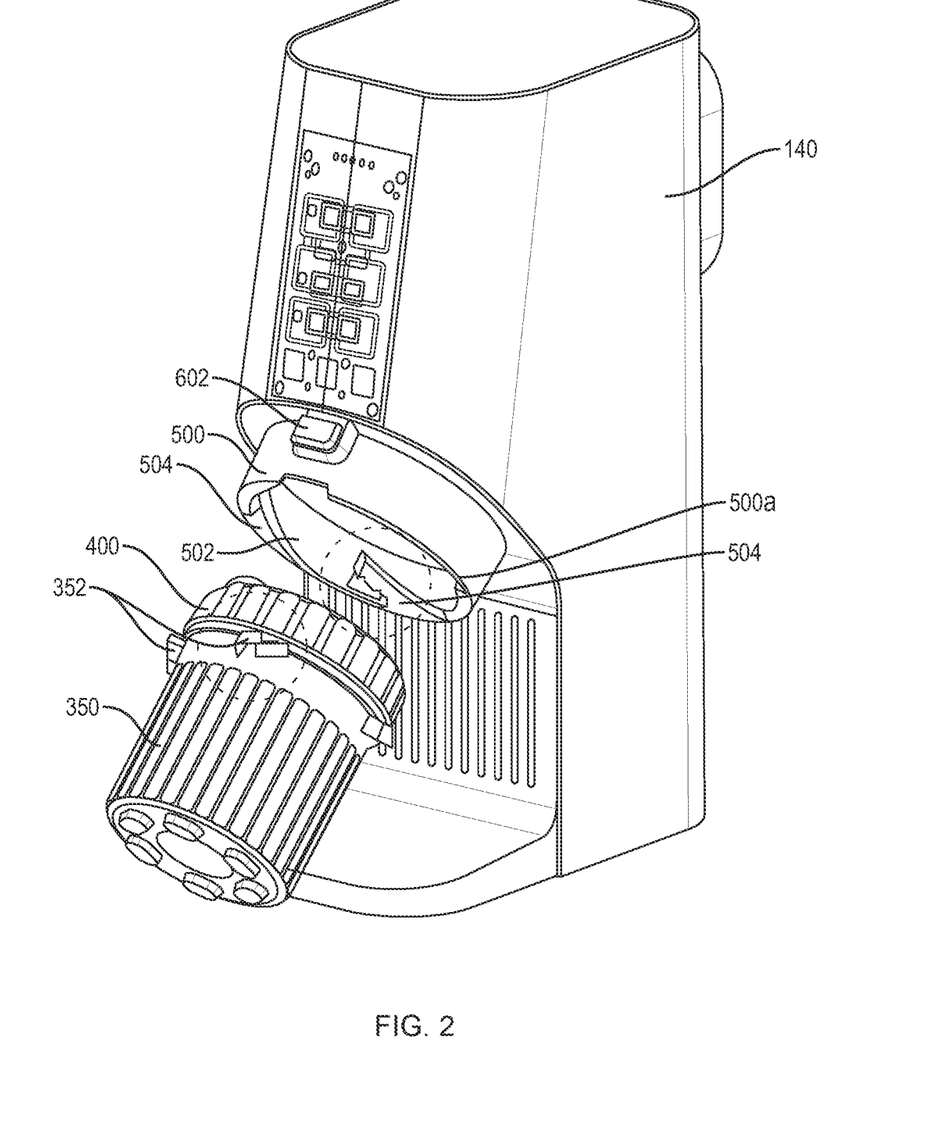
FIG. 2 shows the micro puree machine of FIG. 1 with the container disengaged from the machine according to some embodiments.

FIG. 2 shows the micro puree machine 10 of FIG. 1 with the container 350 and the lid 400 disassembled from the coupling 500 according to some embodiments. As shown in FIG. 2, the coupling 500 may comprise a button 602 for unlocking the container 350 from the coupling 500 as further described below. In embodiments, an inner surface 502 of the coupling 500 may also comprise locating and locking elements for positioning and connecting the container 350 to the coupling 500. For example, the inner surface 502 of the coupling 500 may comprise one or more slots 504 sized to receive at least one corresponding protrusion 352 on an outer surface of the container 350. In some embodiments, the at least one protrusion 352 may be two protrusions 352 spaced on opposing sides of an outer surface of the container 350 and configured to engage two corresponding slots 504 on the coupling 500. In other embodiments, the at least one protrusion 352 may be four protrusions 352 spaced equally apart about an outer surface of the container 350 and configured to engage four corresponding slots 504 on the coupling 500. However, the disclosure contemplates more or fewer than two or four protrusions 352 and slots 504. The disclosure also contemplates that the protrusions may be positioned on the lid 400, rather than the container 350. In embodiments, the slots 504 may be angled and extend in a helical manner relative to an annular lower surface 500a of the coupling 500. Similarly, the protrusions 352 may be correspondingly angled relative to an upper annular surface 350a of the container 350. In embodiments, insertion of the protrusions 352 into the slots 504 may form a bayonet-type mount.

Figure 3A:
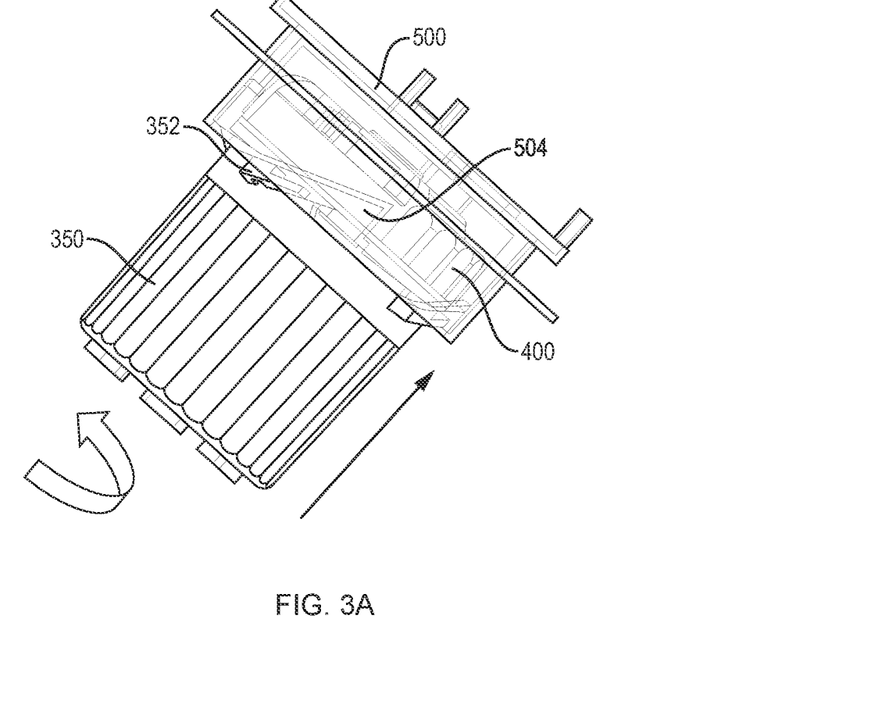
FIGS. 3A and 3B illustrate rotation of the container into the coupling of the micro puree machine, according to some embodiments.
Figure 3B:
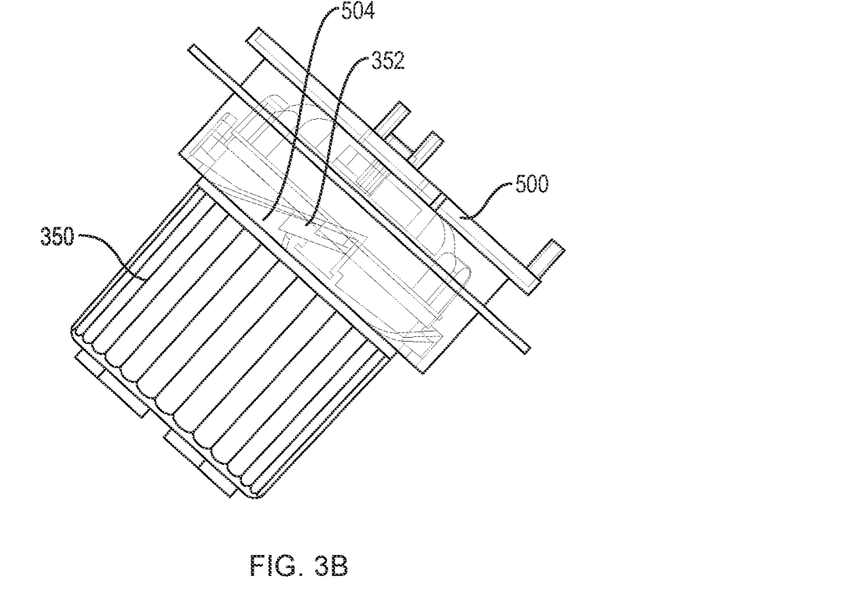

FIG. 3A shows the container 350 inserted into the coupling 500 (shown in a transparent view for ease of illustration) but before the container 350 is secured to the coupling 500 according to some embodiments. As shown in FIG. 3A, the user may rotate the container 350 relative to the coupling 500 in a first direction (e.g., clockwise) such that the protrusions 352 rotate into the slots 504, securing the container 350 to the coupling 500 (FIG. 3B). Because of the angle of the slots 504 and the protrusions 352, rotating the container 350 relative to the coupling 500 may cause the container 350 to move both rotationally and axially within the coupling 500.

Figure 3C:
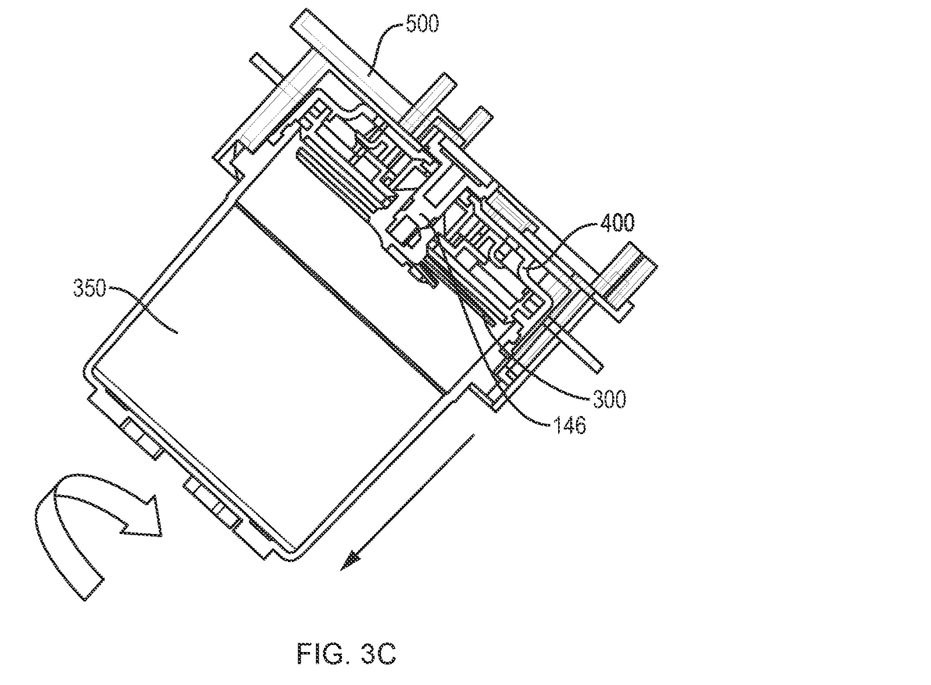
FIGS. 3C and 3D illustration rotation of the container out of the coupling of the micro puree machine, according to some embodiments.
Figure 3D:
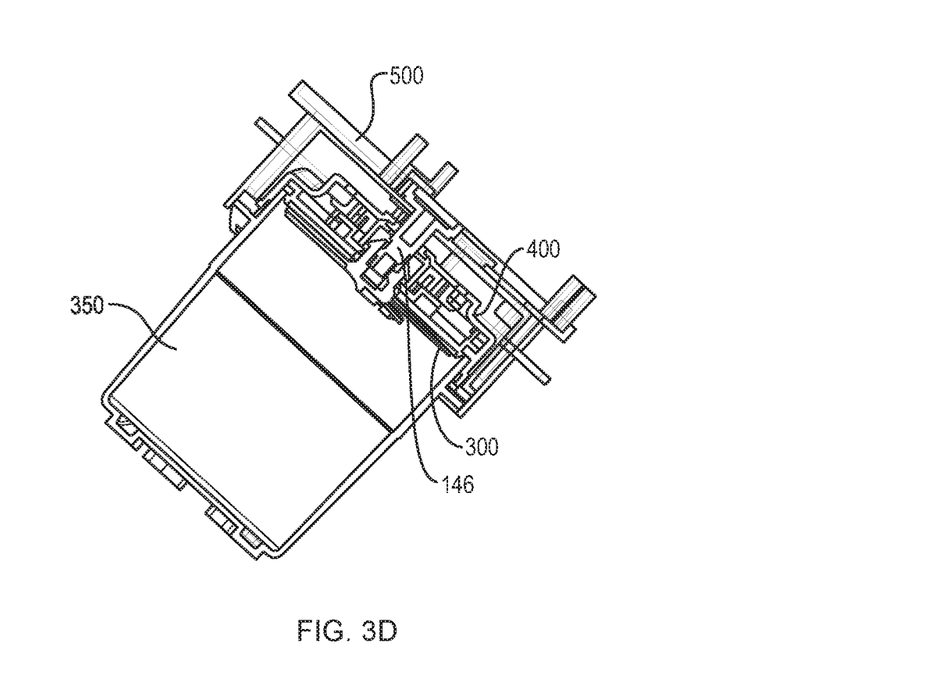

FIG. 3C shows a cross-sectional view of the container 350 secured to the coupling 500 according to some embodiments. As shown in FIG. 3C, the lid 400 may house a blade 300 that engages a power shaft 146 when the container 350 is secured to the coupling 500. When blending frozen ingredients, an ice wall may form between the power shaft 146 and the blade 300, requiring a greater force to disengage the blade 300 from the power shaft 146. However, as shown in FIG. 3D, as the user rotates the container 350 relative to the coupling 500 in a second direction (e.g., counterclockwise) to disengage the container 350 from the coupling 500, the container 350 may move both rotationally and axially away from the coupling 500. This rotational and axial movement may advantageously allow the blade 300 to disengage from power shaft 146 using less force than would be needed if the container 350 could only move rotationally relative to the coupling 500.

Figure 4A:
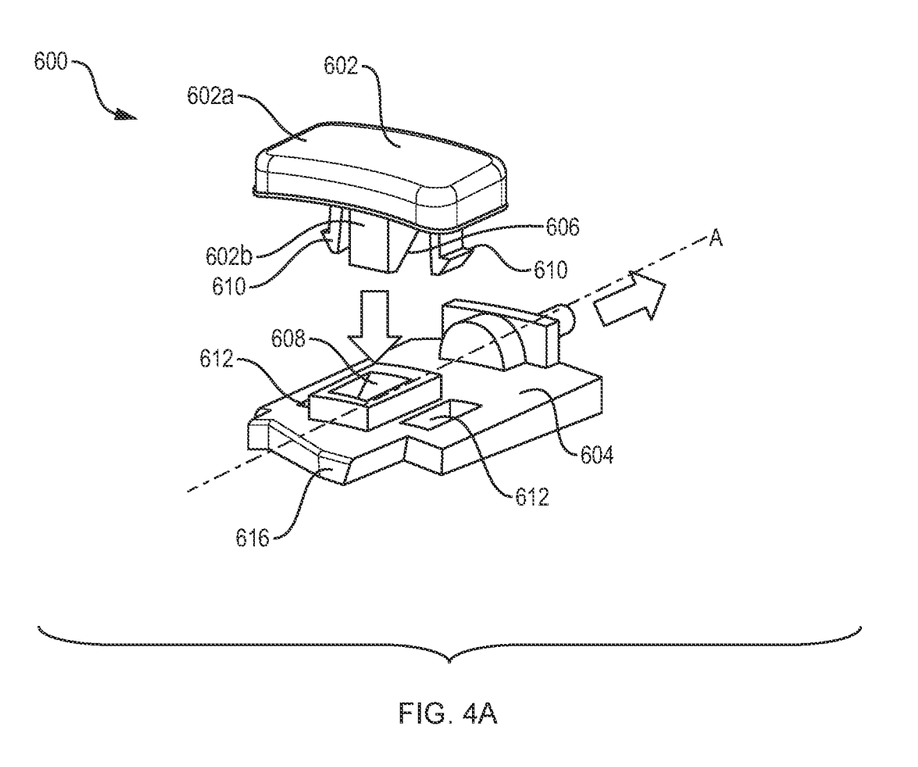
FIGS. 4A-C illustrate components of a bowl lock assembly, according to some embodiments.
Figure 4B:
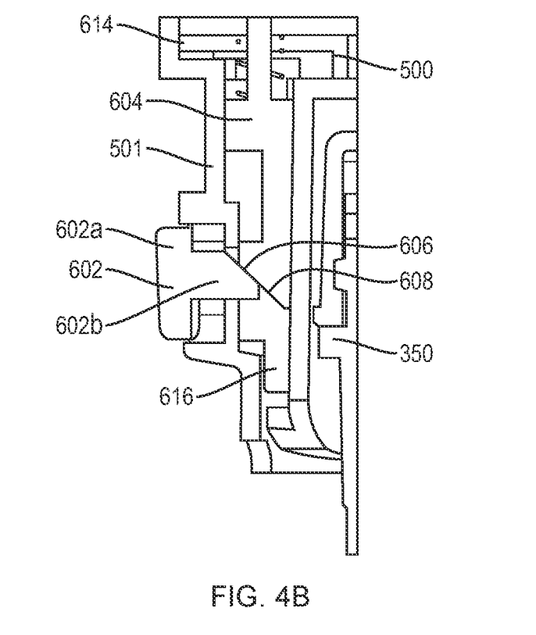
Figure 4C:
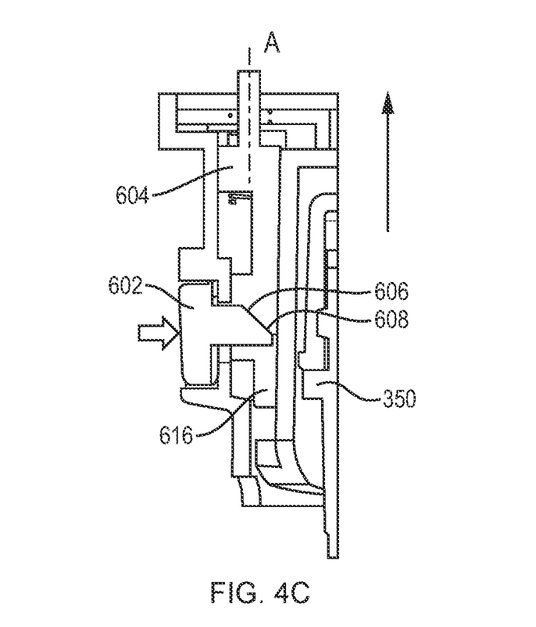

FIGS. 4A-C illustrate components of a bowl lock assembly 600 of this disclosure according to some embodiments. As shown in FIG. 4A, the bowl lock assembly 600 may comprise the button 602 and a moveable clip 604. The button 602 may comprises a first portion 602a and a second portion 602b having a first angled surface 606. The button 602 may be assemblable to the clip 604 through flexures 610 configured to engage corresponding slots 612 on the clip 604. The first angled surface 606 may be configured to engage a second angled surface 608 on the clip 604 such that actuating the first portion 602a of the button 602 (such as by pressing) toward the clip 604 causes the clip 604 to move along the container axis A. A projection 616 on the clip 604 may be configured to engage the protrusions 352, as further described below.

As shown in FIG. 4B, the button 602 may extend through an outer wall 501 of the coupling 500 such that the first portion 602a is engageable by a user while the second portion 602b extends into the interior of the coupling 500. The clip 604 may be positioned within the interior of the coupling 500 and may be biased by a spring 614 or other biasing element toward a locked position, as shown. When the container 350 is in the locked position (that is, when the protrusions 352 have been fully rotated into the slots 504 of the coupling 500), the first angled surface 606 of the button 602 may only partially engage the second angled surface 608 on the clip 604. In this position, the projection 616 on the clip 604 may prevent the protrusions 352 from rotating out of the slots 504. As shown in FIG. 4C, when the user presses the button 602, the first angled surface 606 may fully engage the second angled surface 608 on the clip 604, moving the clip 604 along the container axis A against the force the spring 614. In this position, the projection 616 may no longer prevent the protrusions 352 from rotating out of the slots 504, allowing the user to rotate the container 350 out of the coupling 500.

Figure 5A:
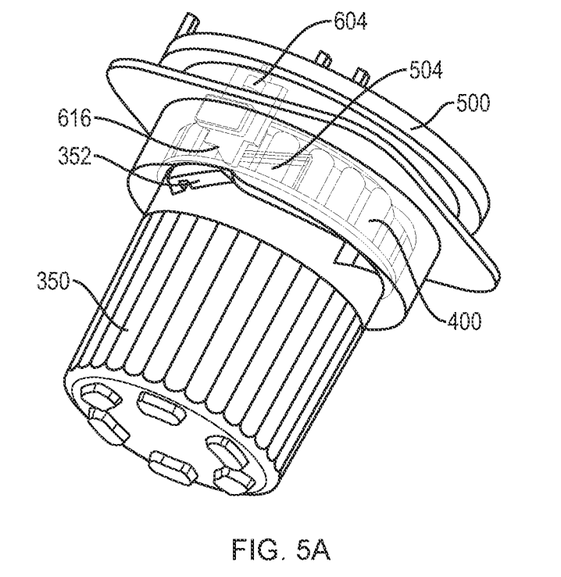
FIGS. 5A-D illustrate a method of using the bowl lock assembly of FIGS. 4A-C to lock and unlock the container from the micro puree machine, according to some embodiments.
Figure 5B:
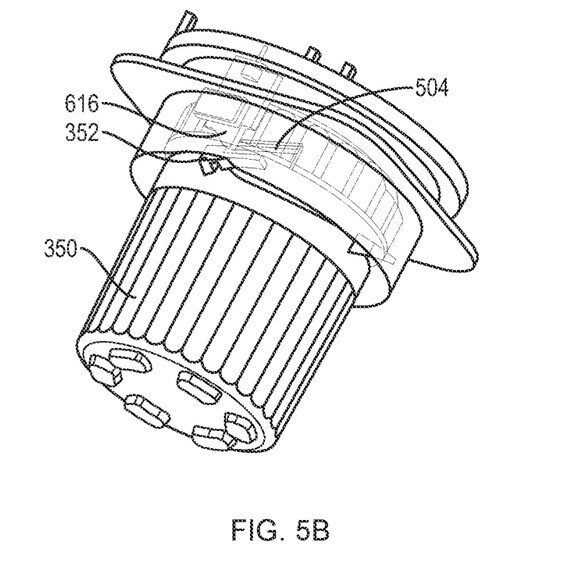
Figure 5C:
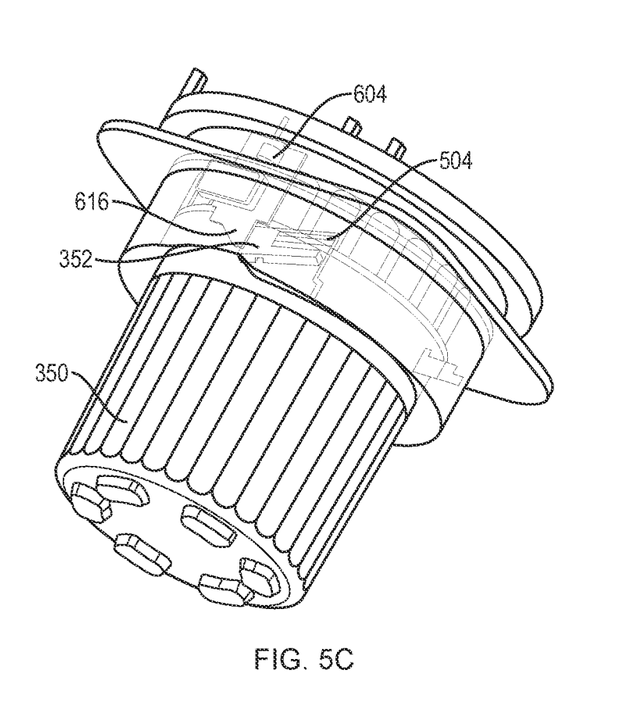
Figure 5D:
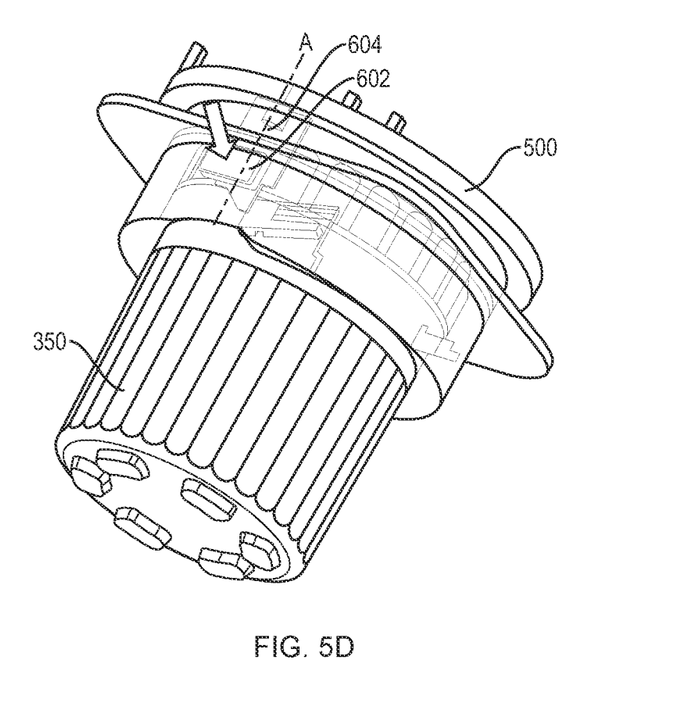

FIGS. 5A-D illustrate a method of locking and unlocking the container 350 from the coupling 500 using the locking assembly 600, according to some embodiments. As shown in FIG. 5A, the user may first insert the container 350 into the coupling 500 such that the protrusions 352 align with the slots 504 on the coupling 500. In this relative position of the container 350 and the coupling 500, the clip 604 may be biased by the spring 614 in the downward position. As shown in FIG. 5B, the user may rotate the container 350 in a first direction (e.g., clockwise) such that the protrusions 352 begin to rotate into the slots 504. As the protrusion 352 rotates past the clip 604, the protrusion 352 pushes the clip 604 upwards against the force of the spring 614. As shown in FIG. 5C, as the user continues to rotate the container 350, the protrusion 352 may rotate passed the projection 616 on the clip 604. Once the protrusion 352 is clockwise of the projection 616, the spring 614 may cause the projection 616 to move downward, preventing the protrusion 352 from being rotated counterclockwise out of the slot 504. As shown in FIG. 5D, when the user wishes to remove the container 350 from the coupling 500, the user may actuate the button 602 to move the clip 604 upwards along the container axis A such that it no longer blocks the protrusion 352 from rotating counterclockwise. This allows the user to rotate the container 350 counterclockwise out of the coupling 500.

Figure 6A:
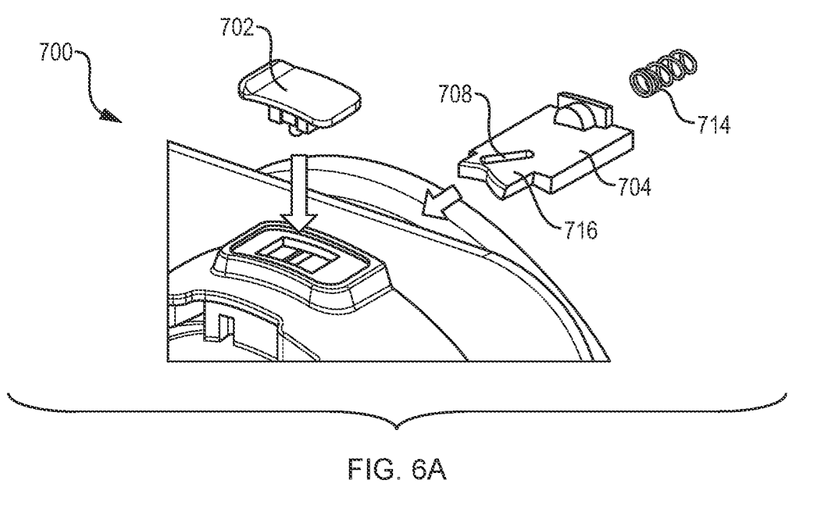
FIGS. 6A-E illustrate components of an alternate bowl lock assembly of this disclosure according to some embodiments.
Figure 6B:
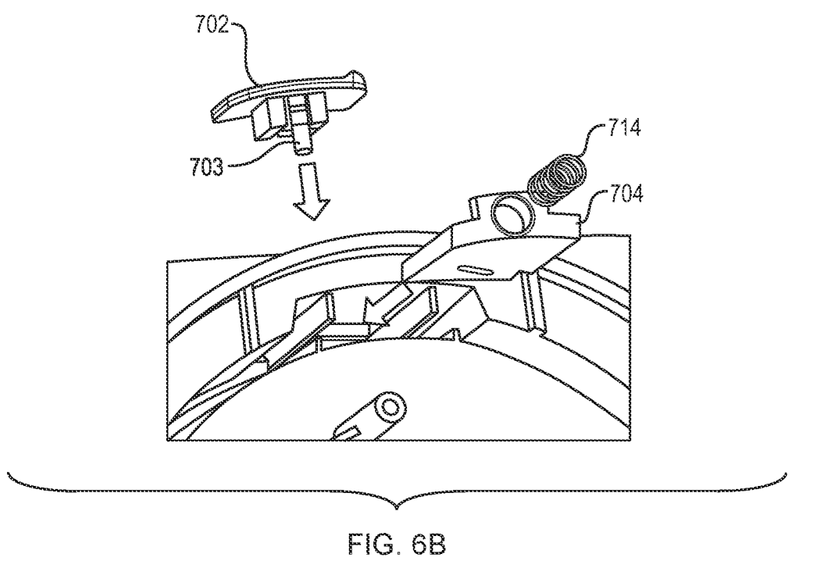
Figure 6C:
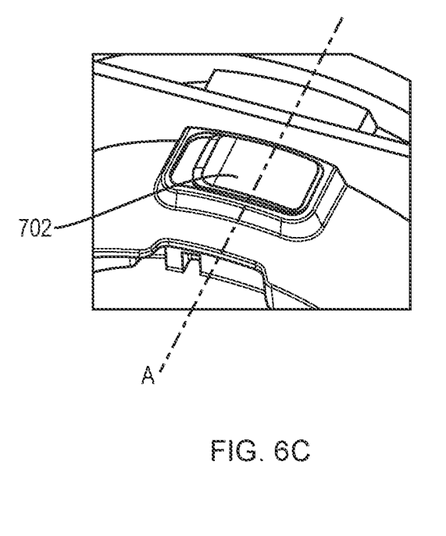
Figure 6D:
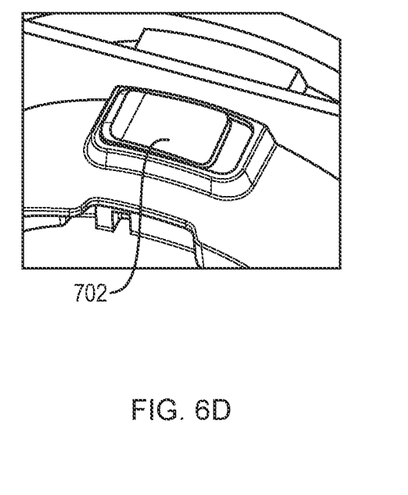
Figure 6E:
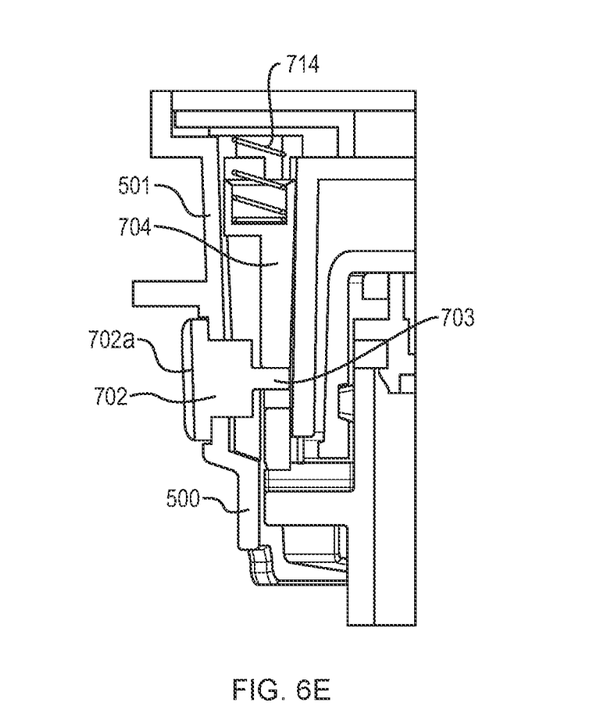

FIGS. 6A-G illustrate an alternate bowl lock assembly 700 of this disclosure according to some embodiments. As shown in FIG. 6A, the bowl lock assembly 700 may comprise a button 702 and a moveable clip 704. The button 702 may comprises a pin 703 (FIG. 6B) configured to engage an angled slot 708 on the clip 704. A projection 716 on the clip 704 may be configured to engage the protrusions 702 on the container 350. In embodiments, sliding the button 702 along an axis perpendicular to the container axis A from a locked position (FIG. 6C) to an unlocked position (FIG. 6D) may cause the clip 704 to move along the container axis A. As shown in FIG. 6E, the button 702 may extend through an outer wall 501 of the coupling 500 such that a first portion 702a is slidable by a user while the pin 703 extends into the interior of the coupling 500. The clip 704 may be positioned in the interior of the coupling 500 and may be biased by a spring 714 or other biasing element toward a locked position.

Figure 6F:
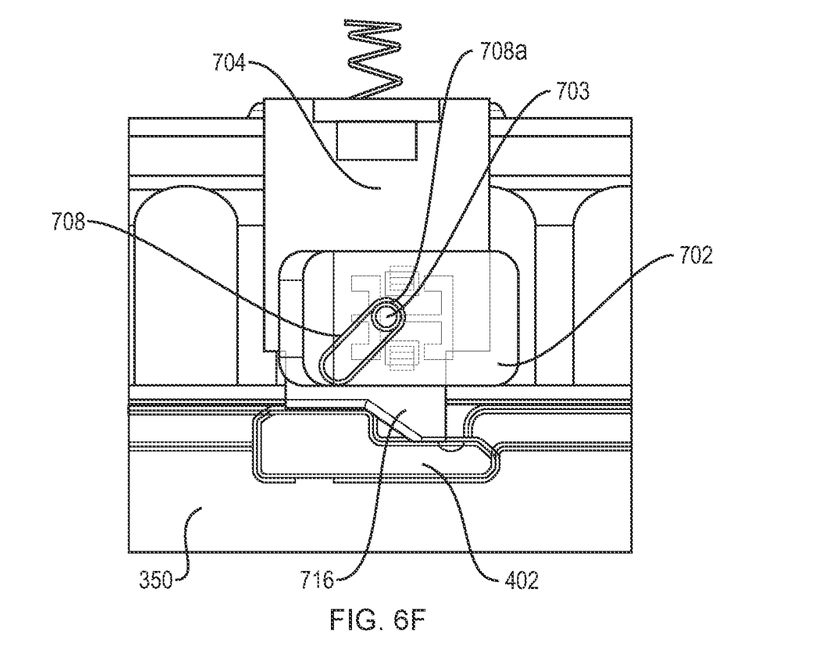
FIGS. 6F and 6G illustrate a method of using the bowl lock assembly of FIGS. 6A-E to lock and unlock the container from the micro puree machine, according to some embodiments.
Figure 6G:
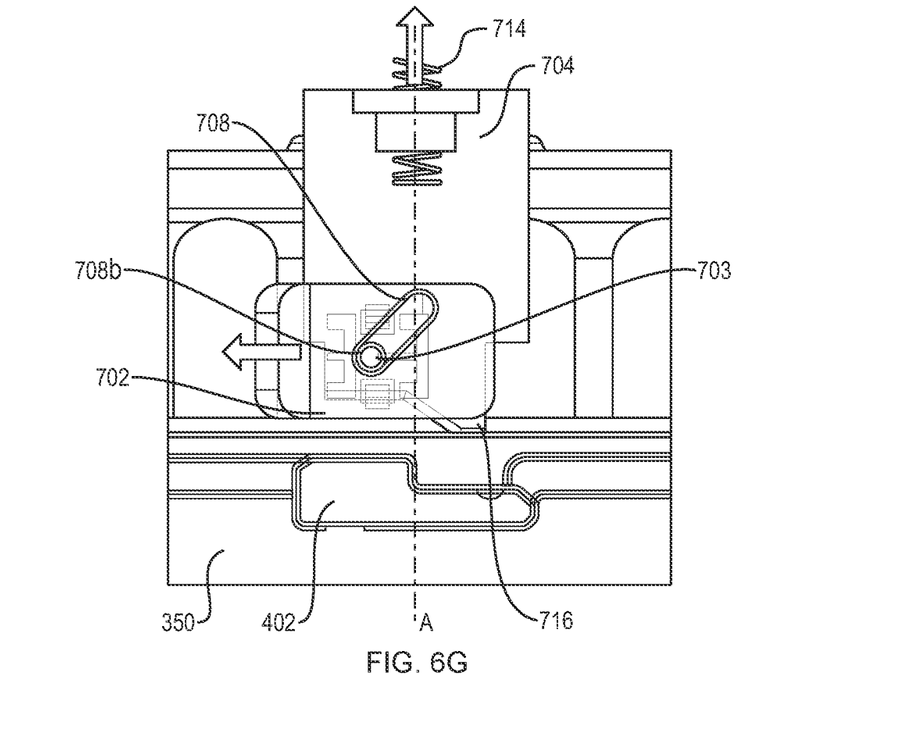

FIGS. 6F and 6G illustrate a method of locking and unlocking the container 350 from the coupling 500 using the locking assembly 700, according to some embodiments. As shown in FIG. 6F, when the container 350 is in the locked position (that is, when the protrusions 352 have been fully rotated into the slots 504 of the coupling 500), the pin 703 of the button 702 may be positioned in an upper end 708a of the angled slot 708. In this position, the projection 716 on the clip 704 may prevent the protrusions 352 from rotating out of the slots 504. As shown in FIG. 6G, when the user slides the button 702 along an axis perpendicular to the container axis A, the pin 703 also moves to the lower end 708b of the angled slot 708. This movement of the pin 703 may cause the clip 704 to move along the container axis A against the force the spring 714. In this position of the clip 704, the projection 716 may no longer prevent the protrusions 352 from rotating out of the slots 504, allowing the user to rotate the container 350 out of the coupling 500.

While the disclosure particularly shows and describes preferred embodiments, those skilled in the art will understand that various changes in form and details may exist without departing from the spirit and scope of the present application as defined by the appended claims. The scope of this present application intends to cover such variations. As such, the foregoing description of embodiments of the present application does not intend to limit the full scope conveyed by the appended claims.

I claim:

1. A twist off container and coupling assembly of a micro puree machine, the assembly comprising:
   a container, the container comprising:
      a first open end;
      a second closed end; and
      at least one protrusion on an outer surface of the container adjacent the first open end;
   a lid coupled to the first open end of the container; and
   a coupling on the micro puree machine, the coupling comprising at least one ramped slot on an interior surface of the coupling, the at least one ramped slot angled relative to a lower annular surface of the coupling, an opening of the at least one slot defining a portion in contact with the lower annular surface of the coupling;
   wherein the at least one protrusion is configured to slidably engage the at least one ramped slot when the container is rotated in a first direction;

wherein the at least one protrusion is correspondingly angled relative to an upper annular surface of the container such that, when the container is rotated in the first direction, the container moves both axially and rotationally relative to the coupling such that the lid is insertable into the coupling; and wherein a container axis extending between a top and a bottom of the container extends at an angle with respect to a vertical axis of the micro puree machine when the container is locked to the coupling, the vertical axis of the micro puree machine extending perpendicular to a bottom surface of the micro puree machine.

2. The twist off container and coupling assembly of claim 1, wherein the at least one ramped slot and the at least one protrusion form a helical bayonet mount.

3. The twist off container and coupling assembly of claim 1, wherein the at least one protrusion is two protrusions, and the at least one ramped slot is two ramped slots, each of the two protrusions configured to slidably engage a respective one of each of the two ramped slots.

4. The twist off container and coupling assembly of claim 3, wherein the two protrusions are positioned on opposing sides of the outer surface of the container.

5. The twist off container and coupling assembly of claim 1, wherein the at least one protrusion is four protrusions, and the at least one ramped slot is four ramped slots, each of the four protrusions configured to slidably engage a respective one of each of the four ramped slots.

6. The twist off container and coupling assembly of claim 5, wherein the four protrusions are equally spaced apart about the outer surface of the container.

7. The twist off container and coupling assembly of claim 1, wherein the angle is between 1 and 180 degrees.

8. The twist off container and coupling assembly of claim 1, wherein the angle is between 45 and 55 degrees.

9. The twist off container and coupling assembly of claim 1, wherein the lid is configured to house a blade of the micro puree machine.

10. The twist off container and coupling assembly of claim 1, wherein the coupling further comprises a user-actuatable button on an outer surface of the coupling, the user-actuatable button configured to allow the container to rotate in a second direction opposite the first direction when the button is actuated by a user.

* * * * *